Figure 1:
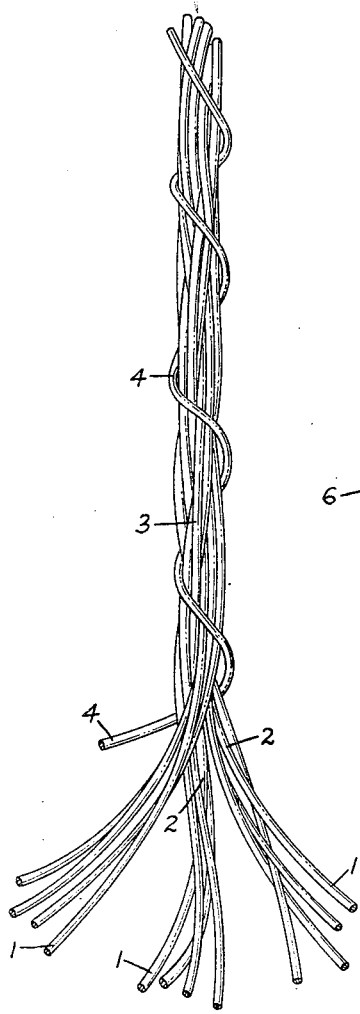

May 27, 1952  P. M. BOURDON  2,598,033
METALLIC REINFORCING CORD FOR PNEUMATIC TIRES
Filed July 6, 1949

INVENTOR.
PIERRE MARCEL BOURDON
BY
HIS ATTORNEYS.

Patented May 27, 1952

2,598,033

UNITED STATES PATENT OFFICE 2,598,033

METALLIC REINFORCING CORD FOR PNEUMATIC TIRES

Pierre Marcel Bourdon, Paris, France, assignor to Manufacture de Caoutchouc Michelin (Puiseux, Boulanger & Cie), Clermont-Ferrand (Puy-de-Dome), France Application July 6, 1949, Serial No. 103,194
In France December 27, 1948

4 Claims. (Cl. 57—144)

This invention relates to improvements in steel or steel and other metallic cables. More particularly, it relates to a metal cable for use in the manufacture of tread or sidewall plies in pneumatic tires in which the cables replace entirely or in part the usual reinforcing elements formed of cotton, rayon, nylon or other similar synthetic or natural products.

It is essential that metallic cables used in tire casings or carcasses be extremely flexible. In use, they will be bent sharply and must withstand repeated bending or flexing without change in their mechanical characteristics if a satisfactory operating life is to be obtained. The properties of flexibility and resistance can only be obtained with cables which are formed of fine wires arranged in very flexible groupings.

Moreover, under normal operating conditions of the tires, the cords, particularly in the tread layers of the casings, are subjected to violent stresses arising from axial compression of the cables which tend to produce a separation or dislocation of the strands or filaments of the cables. These stresses, termed "buckling stresses," result in permanent deformation of the filaments or strands if the resistance to axial compression of the cable is insufficient. The strands of which the cable is formed separate one from another and one or several of the strands may become displaced or disarranged. In other words, the strands open up and the wires which have lost contact with adjacent wires are bent sharply and thereby are permanently deformed and weakened so that their resistance to repeated flexing and the resistance to buckling stresses is considerably decreased.

Resistance of the cables to buckling stresses can be overcome by using wires of greater thickness or diameter, but only at the loss of flexibility which is essential, as indicated above.

A great many different types of cables are already known, which consist of strands of three or four wires of small diameter which are suitable for certain classes of pneumatic tires. Cables consisting of one or more strands of two, three or four wires have been produced heretofore and these cables can be made resistant to damage by repeated flexing providing their component wires are sufficiently fine and they are made of steel of suitable quality and their surfaces are free from defects. On the other hand, these prior cables have relatively small resistance to axial compression and they are not suitable for use in the tire plies which are subjected to buckling or compression stresses.

The present invention has for its principal object the production of metal cables for use in the plies of tires which are characterized by high resistance to axial compression or buckling stresses while at the same time being highly flexible, thereby permitting them to be used without unduly stiffening the tire casing or without shortening their operating life.

In accordance with the present invention, typical cables are characterized by the fact that resistance to axial compression is increased by arranging around the strands of a cable formed of fine wires, a sheath formed of one or more helically wound wires in loosely associated turns. In this way, the cables acquire a high resistance to buckling stresses due to the restraining action of the sheath while at the same time retaining the flexibility, which the cable normally possesses. The present invention thereby avoids the necessity of adopting a compromise between two apparently contradictory characteristics, namely, flexibility which requires the use of fine wire and resistance to axial compression which heretofore was obtained only with thick wires which reduce the flexibility of the cables.

More particularly, the cables may be made up of a plurality of strands which are twisted together, each strand being formed of several fine wires twisted together and having one or more flexible wires wound relatively loosely, or with their turns in slightly spaced relation around the exterior of the group of twisted strands. The loose arrangement of the helically wound turns of wire constituting the sheath provides space to permit the rubber of the plies or the carcass to penetrate between the wires of the cable and thereby assures a strong bond between the rubber and the cables. With this type of construction, the wires of the sheath of the cord bear against and prevent unwanted displacement or deflection of the wires making up the twisted strands and also the strands themselves. As a result, the wires of the strands cannot be displaced laterally to any substantial degree so that buckling stresses cannot cause the wires to be bent sharply and weaken them. The wire or wires forming the sheath also limit the stretching and slipping of the wires of the strands without binding them so tightly together that flexibility of the cable is appreciably decreased.

Figure 2:
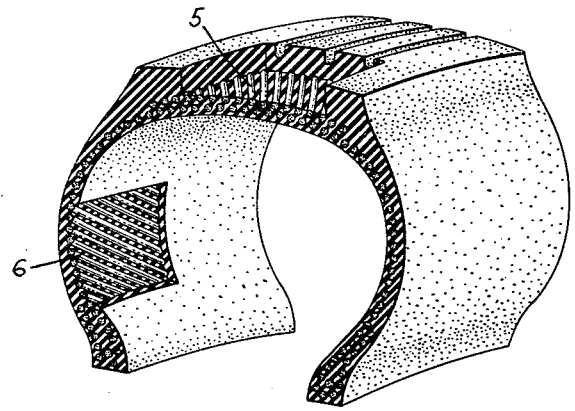

For a better understanding of the present invention, reference may be had to the accompanying drawing, in which:

Fig. 1 is a side view of a typical cable embodying the present invention with the ends of the wires thereof partially separated to illustrate more clearly their relation; and Fig. 2 is a perspective view of a portion of a tire casing partially broken away to illustrate the positions of the cables therein.

Referring now to Fig. 1 of the drawing, a typical cable may be made up of a plurality of wires 1 of thin, highly flexible steel or similar material. In the example illustrated, four of the wires 1, each of which is about .15 mm. in diameter, are twisted together with a pitch of 7.5 mm. to the left to form a strand 2. Three of such strands may be twisted together with a pitch of 12 mm. to the right to form a cable. It will be understood, of course, that each strand 2 may be made up of more or less than four wires 1 and that more or fewer of the strands 2 may be twisted together to form the cable. Such a cable as that described above is highly flexible and is most resistant to repeated flexing so that it can be used with great facility in certain types of tire casing plies. However, this cable is not resistant to compression stresses and, therefore, it is not suitable for use in zones or plies of the tire where large axial compression stresses are encountered.

The cable can, however, be made very resistant to axial compression stresses without substantial loss of flexibility by winding around the outside of the three strand cable a relatively open sheath formed of one or more wires 4. In a preferred form of cable, the wire 4 may be about .15 mm. in diameter and is wound helically with a pitch of 2.5 mm. While the drawing illustrates only one wire wrapped around the cable and this wire has a relatively large pitch, it will be understood that a plurality of such wires may be wound to form a sheath which is not so tightly associated that it prevents ready penetration of the rubber of the casing through the sheath and between the strands and the wires making up the strands.

Moreover, while the wire or wires 4 which are wound to form a sheath may be of the same cross-sectional shape as the wires of the strands, the sheath wires may be of different section. For example, a thin flat wire wound helically around the twisted strand 2 will increase the resistance of the wire to buckling without increasing substantially the overall diameter of the cable.

It will also be understood that some of the wires 4 constituting the sheath may be replaced with natural or artificial textile threads in order to bond the cable securely with the rubber plies.

Fig. 2 illustrates several applications of cables of the type described above to pneumatic tire casings. Thus, one or more plies 5 of such cables laid in different directions may be positioned in the carcasses behind the ground contacting tread portion of the tire in order to improve the traction of the tire.

Likewise, one or more plies 6 containing the cables laid diagonally or in the medium plane of the tire may be used for reinforcing the sidewalls and the casing behind the tread portion.

Also, while the invention has been described more particularly with reference to cables intended for use in the construction of casings of pneumatic tires, these cables may be used for many other purposes, for example, for reinforcing other articles made of natural or artificial rubber or plastic materials. Therefore, the form of the invention described herein should be considered as illustrative and not as limiting the scope of the following claims.

I claim:

1. A metallic cable for use as a reinforcement in an article formed from rubber, plastic material and the like consisting of a core formed of flexible metallic cord and at least one metallic wire wound helically around the core without substantial pressure thereon.

2. The metallic cable set forth in claim 1 in which the core comprises a plurality of wires twisted to form a single strand and a single wire is wound helically around the core.

3. The metallic cable set forth in claim 1 in which the core comprises at least three strands each consisting of a plurality of steel wires.

4. The metallic cable set forth in claim 1 in which the core comprises three strands each formed of four steel wires about 15/100 mm. in diameter having a pitch of 7.5 mm. to the left, said strands being twisted together with a pitch of 12 mm. to the right, and the helically wound wire is 15/100 mm. in diameter and has a pitch of 2.5 mm.

PIERRE MARCEL BOURDON.

REFERENCES CITED

The following references are of record in the file of this patent:

UNITED STATES PATENTS

| Number | Name | Date |
|---|---|---|
| 2,257,646 | Pierce | Sept. 30, 1941 |
| 2,492,352 | Bourdon | Dec. 27, 1949 |

FOREIGN PATENTS

| Number | Country | Date |
|---|---|---|
| 881,733 | France | Feb. 4, 1943 |